United States Patent [19]

Reuter et al.

[11] Patent Number: 5,307,535
[45] Date of Patent: May 3, 1994

[54] CLEANING APPARATUS FOR OPTICAL AND MAGNETO-OPTICAL DISKS

[75] Inventors: Klaus Reuter; Klaus P. Schoen, both of Wiesbaden, Fed. Rep. of Germany

[73] Assignee: Hoechst Aktiengesellschaft, Frankfurt am Main, Fed. Rep. of Germany

[21] Appl. No.: 53,387

[22] Filed: Apr. 28, 1993

[30] Foreign Application Priority Data

May 8, 1992 [DE] Fed. Rep. of Germany ....... 9206174

[51] Int. Cl.⁵ .................... G11B 3/58; B08B 11/02
[52] U.S. Cl. .................. 15/97.1; 15/210.1; 206/310; 206/472; 360/137; 369/72
[58] Field of Search ............ 15/97.1, 210 R, DIG. 12, 15/DIG. 13; 206/310, 444, 472–475, 373; 360/133, 137; 369/72, 273

[56] References Cited

U.S. PATENT DOCUMENTS

| | | | |
|---|---|---|---|
| 4,100,643 | 7/1978 | Horian et al. | 15/47.1 X |
| 4,569,098 | 2/1986 | Kawabe | 206/309 X |
| 4,635,797 | 1/1987 | Bankier | 206/472 |
| 4,641,750 | 2/1987 | Johnson et al. | 206/472 X |
| 4,718,550 | 1/1988 | Johnson | 206/472 X |
| 4,819,799 | 4/1989 | Nomula et al. | 206/444 X |
| 4,836,374 | 6/1989 | Hutchins et al. | 206/373 X |
| 5,090,078 | 2/1992 | Kamakura et al. | 15/97.1 |

FOREIGN PATENT DOCUMENTS

0417726A2 3/1991 European Pat. Off. .

*Primary Examiner*—Bryon P. Gehman
*Attorney, Agent, or Firm*—Foley & Lardner

[57] ABSTRACT

A cleaning apparatus for optical or magneto-optical storage disks includes a first rectangular part having four lateral edges and a raised interior, the interior having at least three troughs for holding utensils for cleaning the optical or magneto-optical storage disks; a second rectangular part having four lateral edges, an interior which is shaped complementary to the interior of the first rectangular part, and a border which runs completely along its four lateral edges for enclosing a disk cassette of a magneto-optical or optical storage disk inserted for cleaning; and a back strap for connecting the two parts to each other such that the two parts can be folded together, similarly to a book, and locked along their lateral edges. The second part further includes a disk bearing which, when the storage disk is inserted, raises the storage disk inside the disk cassette to such an extent that the storage disk is rotatable without friction. A locking device is provided on the interior of the second part for keeping a shutter of the disk cassette open. The interiors of the first and second parts, together with the troughs, the edge beads, the locking device, the disk bearing, and the border are deep-drawn from plastics film.

11 Claims, 3 Drawing Sheets

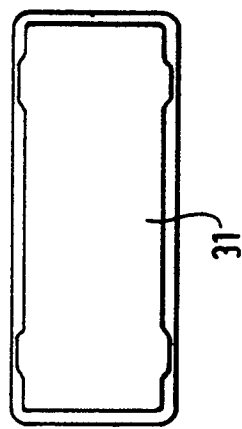
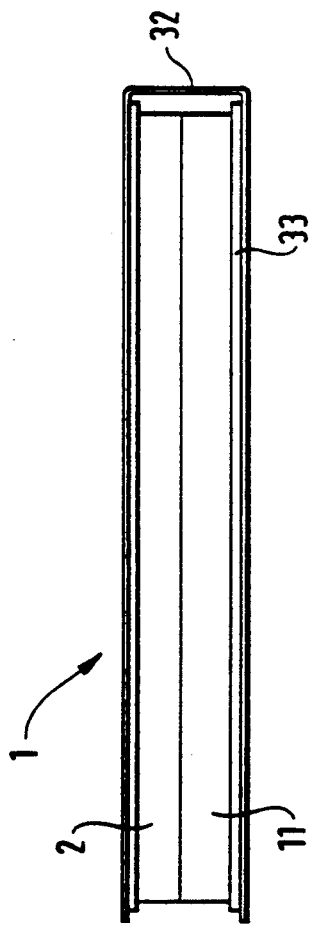
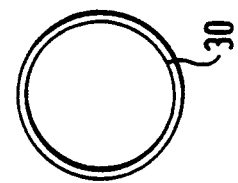
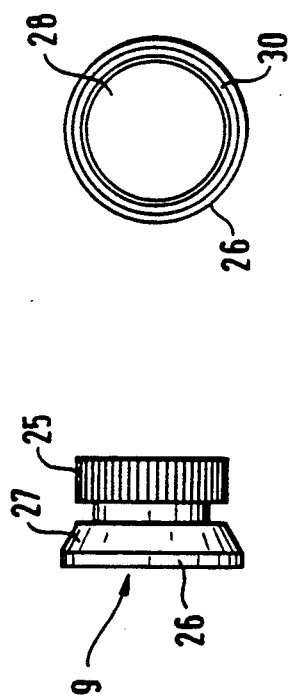

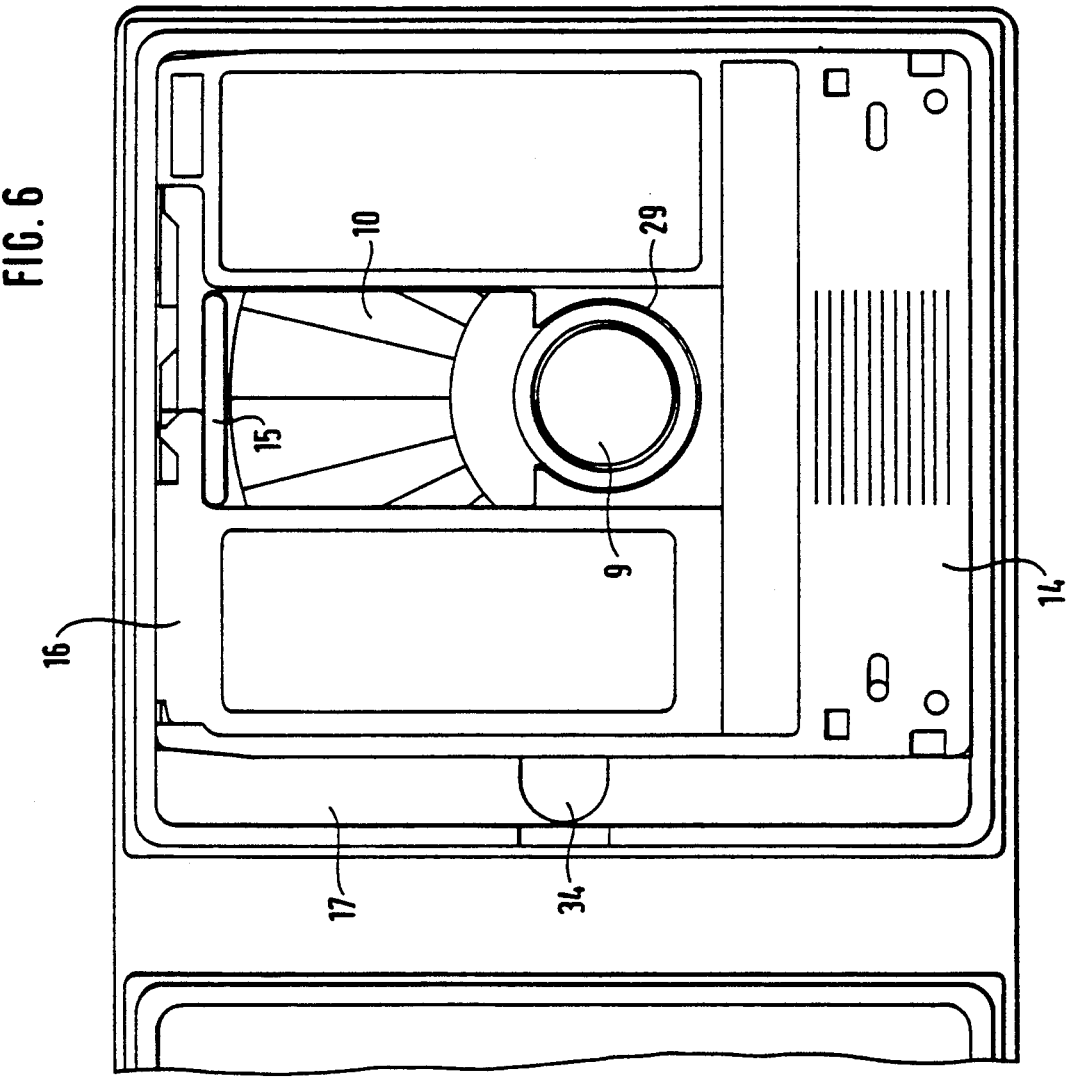

FIG. 3 shows a plan view of a cover which closes a trough for holding cleaning composites;

FIG. 4 shows a side view of a rotary knob for manual rotation of the storage disk to be cleaned in the cleaning apparatus;

FIGS. 5a and 5b show a bottom view of the rotary knob according to FIG. 4 and a rubber ring; and FIG. 6 shows a plan view of the opened cleaning apparatus with inserted disk cassette, whose shutter has been opened.

DETAILED DESCRIPTION OF THE PREFERRED EMBODIMENTS

Figure 1:
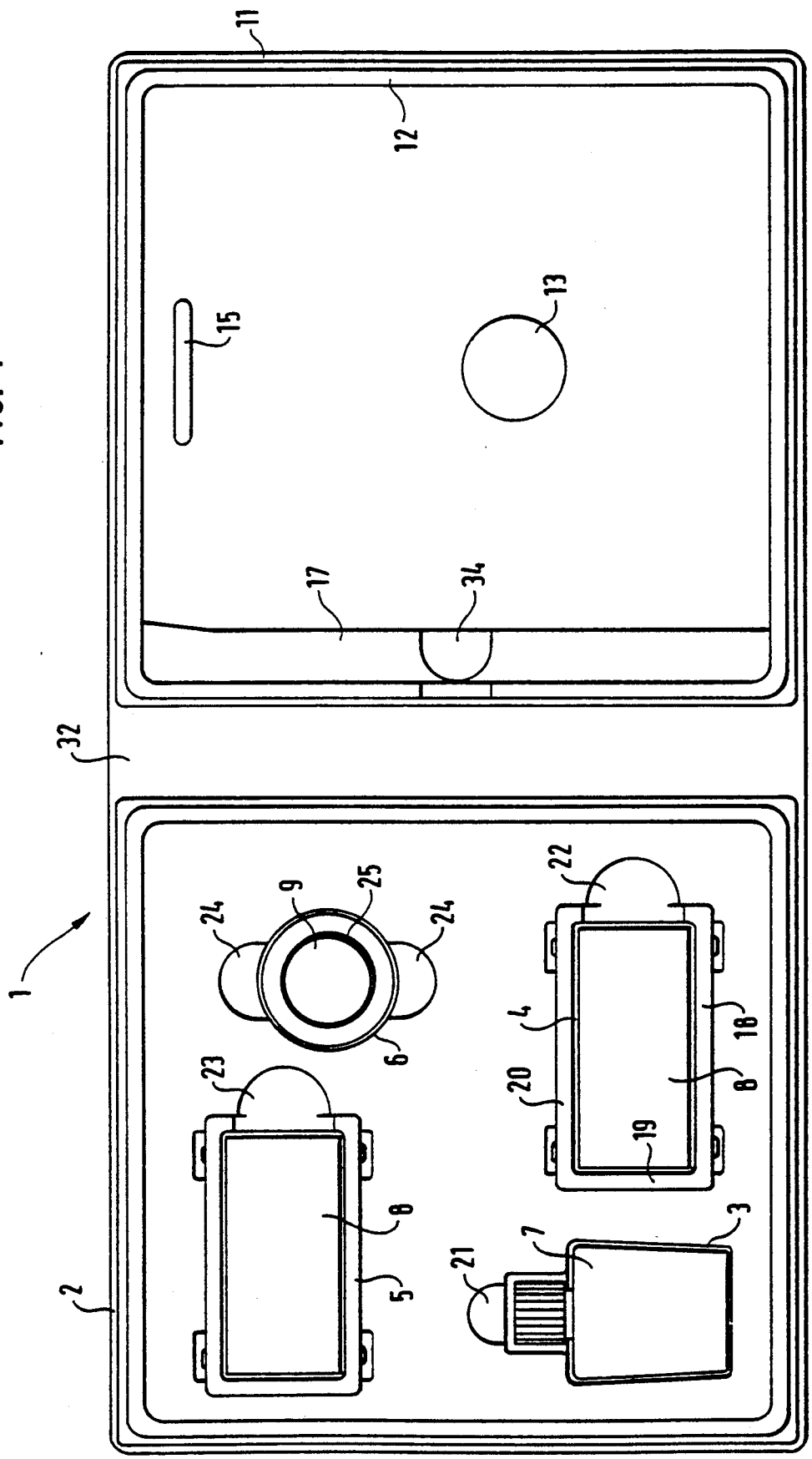

FIG. 1 shows the unfolded or opened cleaning apparatus 1 which comprises two parts 2, 11 which are connected to one another by a back strap 32. The parts 2 and 11 are rectangular or square, the inside of one part 2, the left part in FIG. 1, being raised and having four troughs 3,4,5,6 which hold the utensils 7,8,9 for the cleaning of a magneto-optical or optical storage disk 10, which is partly visible in FIG. 6. Although this is not shown, only three troughs 3,4,5 may also be present. The embodiment of the troughs is such that they each have a shape or outline adapted to the contours of the utensils 7,8,9 to be held. The utensils are a bottle 7 which fits into the first trough 3, cleaning composites or cleaning pads 8 of textile or fabric cloth and plastics film which are housed in the second and third troughs 4,5, and a rotary knob which is held in the fourth trough 6. The bottle 7 and the rotary knob 9 are snapped firmly into the associated troughs 3 and 6. The second and third troughs 4,5 filled with the cleaning composites 8 are each closed by a cover 31 which is shown in the plan view in FIG. 3. The two troughs 4,5 are surrounded on three sides by edge beads 18,19,20 continuously connected to one another. The edge beads 18 and 20 have projecting knobs onto which the covers 31 snap shut, the covers having corresponding projections on their lateral edges, which are flush with the edge beads 18 and 20.

The inside of the other part 11 of the cleaning apparatus 1, the right part in FIG. 1, has a complementary shape to the part 2 and possesses, along the four lateral edges, a closed border 12 which encloses a disk cassette 14 of a magneto-optical or optical storage disk 10 inserted for cleaning (see FIG. 6). The part 11 has a disk bearing 13 on which the storage disk 10 rests. The disk bearing 13 raises the storage disk 10 inside the disk cassette on insertion, to such an extent that the storage disk can be rotated without friction in the disk cassette. A locking means 15 is present as an integral component on the inside of the part 11, close to the upper lateral edge of the border 12 in FIG. 1. The locking means 15 keeps an opened shutter 16 of the disk cassette 14 open so that, in the opened section of the disk cassette 14, the storage disk 10 underneath (see FIG. 6) is accessible for cleaning.

The locking means 15 is a web which runs parallel to, and about 8 to 12 mm away from, the border 12 and, for example, has a length of 32 to 40 mm, a height of 5 mm and a width of 4 to 5 mm.

As is evident from the right part of FIG. 1, a stepped stop 17 is adjacent to one lateral edge of the border 12 of the part 11 holding the storage disk 10. A rounded grip recess 34 which facilitates removal of an inserted disk cassette 14 which rests against the stop 17 and the inside of the opposite lateral edge of the border 12 is present in the middle of the stop 17.

The two parts 2 and 11 are deep-drawn as a whole from plastics film in a single operation, including the troughs 3,4,5,6, the edge beads 18,19,20, the locking means 15, the stop 17, the disk bearing 13 and the border 12, so that no further operations for completion of the cleaning apparatus are required after production of these parts. After insertion of two cardboard reinforcements, the two parts 2 and 11 are usually thermally bonded to an outer film, onto which a jacket 33 of a transparent plastics film (see FIG. 2) is adhesively bonded or thermally bonded. Together with the connecting piece of the deep-drawn film between the two parts 2,11 and the outer film, the jacket 33 also forms the back strap 32 of the cleaning apparatus. FIG. 2 shows the cleaning apparatus 1 in the closed state, in which the two parts interlock along their lateral edges. The closed cleaning apparatus resembles a book in shape.

FIGS. 4 and 5a show the rotary knob 9 in side view and in bottom view, respectively. The rotary knob 9 comprises a knurled grip piece 25 which has a smaller diameter than an attachment 27 which widens conically downward. A rubber ring 30 which fits into a circumferential groove is present in the base surface 26 of the rotary knob 9 (see FIG. 5b). When the rotary knob 9 is placed on the storage disk, the rubber ring provides a frictional connection with the storage disk 10 so that the latter is driven by the rotation of the rotary knob 9. As is evident from the bottom view in FIG. 5a, the attachment 27 has, in its base surface, a recess 28 into which the hub of the storage disk 10 fits. As is evident from FIG. 6, the attachment 27 centers the storage disk 10 in such a way that the outer edge of the attachment is guided in a cassette hole 29 of the disk cassette 14.

The bottle 7 is filled with a cleaning liquid which, for wet cleaning, is applied to a cleaning composite 8 with which the exposed section of the storage disk 10 is then cleaned in the rarotary knob direction, as shown in FIG. 6. Each of the troughs 3 to 6 is equipped with at least one rounded grip recess 21,22,23,24 in order to facilitate removal of the utensils present in each trough. The fourth trough 6 which holds the rotary knob 9 is also equipped with an additional grip recess 24, the two grip recesses being opposite one another on both sides of the trough 6. The cleaning composite 8 of textile or fabric cloth and plastics film ensures that the cloth used for cleaning, i.e. the cleaning surface, is protected from contamination by the plastics film before use, so that the cleaning composites can be stacked in the troughs 4,5 without additional packaging.

The deep-drawing of the parts 2 and 11 permits economical processing with little material consumption and easy cleaning, because the parts 2 and 11 are formed without seams and without undercuts.

While the invention has been described with reference to certain preferred embodiments, numerous modifications and alterations to the described embodiments are possible without departing from the spirit and scope of the invention as defined in the appended claims, and equivalents thereof.

What is claimed is:

1. A cleaning apparatus for an optical or magneto-optical storage disk, comprising:
    a first rectangular part having four lateral edges and a raised interior, the interior including four troughs for holding utensils for cleaning an optical or magneto-optical storage disk, each of the four troughs having a shape adapted to contours of utensils to be held;

a plurality of utensils including a bottle, cleaning composites, and a rotary knob wherein the bottle contains a cleaning liquid for a recording layer of a storage disk and the bottle is snapped into the first trough, the second and third troughs are filled with the cleaning composites, and the fourth trough houses the rotary knob which can be mounted on a hub of a storage disk which is inserted in a second rectangular part, in order to rotate the storage disk manually with the aid of the rotary knob;

the second rectangular part comprising:
 four lateral edges;
 an interior which is shaped complementary to the interior of the first rectangular part;
 a border which runs completely along the four lateral edges for enclosing a disk cassette of a magneto-optical or optical storage disk inserted for cleaning;
 a disk bearing which, when a disk cassette is inserted in the second part, raises a storage disk inside the disk cassette to such an extent that the storage disk is rotatable without friction; and
 a locking means on the interior of the second part for keeping a shutter of a disk cassette open wherein the locking means includes a web which is mounted parallel to the border; and the cleaning apparatus further comprising a back strap for connecting the first and second parts to each other such that the first and second parts can be folded together, similarly to a book, and locked along their lateral edges;

wherein the rotary knob includes a knurled grip piece, an attachment having a base surface and conically widening downward toward the base surface, and a rubber ring fitted into the base surface, which ring, when the rotary knob is placed on a storage disk in frictional connection with the disk, drives the disk during the rotation of the rotary knob.

2. The cleaning apparatus of claim 1, wherein the knurled grip piece has a smaller diameter than the base surface.

3. The cleaning apparatus as claimed in claim 1, wherein the attachment includes, in the base surface, a recess for the hub of the storage disk; and wherein a attachment centers the storage disk by guiding an outer edge of the attachment in a cassette hole of a disk cassette.

4. A cleaning apparatus for an optical or magneto-optical storage disk, comprising:
 a first rectangular part having four lateral edges and a raised interior, the interior including four troughs for holding utensils for cleaning an optical or magneto-optical storage disk, each of the four troughs having a shape adapted to contours of utensils to be held;
 a plurality of utensils including a bottle, cleaning composites, and a rotary knob wherein the bottle contains a cleaning liquid for a recording layer of a storage disk and the bottle is snapped into the first trough, the second and third troughs are filled with the cleaning composites, and the fourth trough houses the rotary knob which can be mounted on a hub of a storage disk which is inserted in a second rectangular part, in order to rotate the storage disk manually with the aid of the rotary knob;

the second rectangular part comprising:
 four lateral edges;
 an interior which is shaped complementary to the interior of the first rectangular part;
 a border which runs completely along the four lateral edges for enclosing a disk cassette of a magneto-optical or optical storage disk inserted for cleaning;
 a disk bearing which, when a disk cassette is inserted in the second part, raises a storage disk inside the disk cassette to such an extent that the storage disk is rotatable without friction; and
 a locking means on the interior of the second part for keeping a shutter of a disk cassette open wherein the locking means includes a web which is mounted parallel to the border; and the cleaning apparatus further comprising a back strap for connecting the first and second parts to each other such that the first and second parts can be folded together, similarly to a book, and locked along their lateral edges;

wherein the second and third troughs are surrounded on three sides by edge beads continuously connected to one another and wherein the cleaning apparatus further comprises covers for closing the second and third troughs by snapping the covers shut onto the edge beads.

5. The cleaning apparatus of claim 4, wherein the web has a length of about 32 to 40 mm, a height of about 5 mm and a width of about 4 to 5 mm.

6. The cleaning apparatus of claim 4, wherein the web is mounted about 8 to 12 mm away from the border.

7. The cleaning apparatus of claim 4, wherein the first and second parts are square.

8. The cleaning apparatus as claimed in claim 4, wherein the second part further comprises a stepped stop having a rounded grip recess and arranged along one lateral edge of the border, wherein an inserted disk cassette rests against the stop and an inside of an opposite lateral edge of the border.

9. The cleaning apparatus as claimed in claim 8, wherein the interiors of the first and second parts, together with the troughs, the edge beads, the locking means, the stop, the disk bearing, and the border are deep-drawn from plastics film.

10. The cleaning apparatus as claimed in claim 4, wherein each of the troughs includes at least one rounded grip recess.

11. The cleaning apparatus as claimed in claim 10, wherein the fourth trough includes an additional grip recess located on a side of the fourth trough opposite the at least one rounded grip recess.

* * * * *